(12) United States Patent
Sakaguchi et al.

(10) Patent No.: US 7,073,342 B2
(45) Date of Patent: Jul. 11, 2006

(54) CONSTANT TEMPERATURE LIQUID CIRCULATING APPARATUS

(75) Inventors: Tetsuo Sakaguchi, Tsukuba-gun (JP); Hirohito Niimi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 163 days.

(21) Appl. No.: 10/913,393

(22) Filed: Aug. 9, 2004

(65) Prior Publication Data

US 2005/0072172 A1 Apr. 7, 2005

(30) Foreign Application Priority Data

Oct. 1, 2003 (JP) ............................. 2003-343461

(51) Int. Cl.
*F25D 17/02* (2006.01)
*F28F 27/00* (2006.01)
*G05D 9/00* (2006.01)

(52) U.S. Cl. ........................... 62/185; 62/188; 165/301; 165/302

(58) Field of Classification Search .................. 62/185, 62/188, 201; 165/96, 275, 301, 302
See application file for complete search history.

(56) References Cited

U.S. PATENT DOCUMENTS

| 3,788,090 | A | * | 1/1974 | Richards ........................ 62/139 |
| 3,833,056 | A | | 9/1974 | McMinn et al. |
| 4,502,289 | A | * | 3/1985 | Kayama ........................ 62/185 |
| 6,003,595 | A | * | 12/1999 | Watanabe ..................... 165/299 |
| 6,044,903 | A | * | 4/2000 | Heilman et al. ............. 165/263 |
| 6,065,302 | A | | 5/2000 | Sada et al. |
| 6,269,873 | B1 | | 8/2001 | Gautier et al. |

FOREIGN PATENT DOCUMENTS

DE 696 25 697 T2 5/2003
GB 2 379 971 3/2003

* cited by examiner

*Primary Examiner*—Marc Norman
(74) *Attorney, Agent, or Firm*—Oblon, Spivak, McClelland, Maier & Neustadt, P.C.

(57) ABSTRACT

The whole main tank for housing the constant temperature liquid the temperature of which is adjusted by a temperature adjusting device is supported in a sub tank with a gap as a heat insulating layer around the main tank. A liquid level regulating mechanism supplies and discharges the constant temperature liquid between inside of the main tank and the gap formed in the sub tank to thereby achieve heat insulation and regulation of the liquid level of the constant temperature liquid housed in the main tank by utilizing the same gap in the sub tank.

8 Claims, 4 Drawing Sheets

(a)

(b)

(d)

(c)

CONSTANT TEMPERATURE LIQUID CIRCULATING APPARATUS

TECHNICAL FIELD

The present invention relates to a circulating apparatus for supplying a constant temperature liquid to a load in a circulating manner in a case of cooling a heat load with the constant temperature liquid, for example.

BACKGROUND ART

In cooling a load, for example, with this type of circulating apparatus, a coolant as a constant temperature liquid a temperature of which is adjusted is housed in a tank and the coolant is supplied to the load through piping by a pump in a circulating manner to thereby cool the load. The coolant the temperature of which rises due to cooling of the load and which flows back into the tank exchanges heat with a refrigerant in a heat exchanger to thereby adjust the temperature.

The load is normally connected to the circulating apparatus through piping prepared by a user. A kind, a disposition place, and the like of the load are different depending on users. Therefore, if flow path capacities in the piping and the load are large, a liquid level in the tank may lower by a large amount when operation of the circulating apparatus starts to supply the coolant to the piping and the heat load. In some cases, there is a fear that the reduction in the liquid level in the tank provides a hindrance to operation of the pump.

On the other hand, it is preferable to recover all the coolant filling the load and the piping connecting the apparatus and the load into the tank when the operation of this circulating apparatus is completed or at the time of maintenance, inspection, or the like of the apparatus. However, if the coolant of such an amount that a proper liquid level is obtained in the tank in a steady operating state of the apparatus has been used, all the coolant may not be housed in the tank and the coolant may overflow from the tank in recovering the coolant depending on the flow path capacities in the piping and the load.

Therefore, in order to solve such problems, there is an apparatus in which a liquid level regulating chamber is provided in a tank and communicates through a bottom portion thereof with inside of the tank, compressed gas is supplied to and discharged from the liquid level regulating chamber to cause a constant temperature liquid to flow out from the liquid level regulating chamber into the tank or flow from the tank into the liquid level regulating chamber to thereby regulate a liquids level of the constant temperature liquid in the tank as disclosed in Japanese Patent Application Laid-open No. 2002-181427 (JP-A).

This circulating apparatus has advantages that the liquid level of the constant temperature liquid in the tank does not change by a large amount when the operation starts or is completed and that a small amount of constant temperature liquid can efficiently be utilized.

PROBLEMS TO BE SOLVED BY THE INVENTION

However, in the circulating apparatus disclosed in JP-A 2002-181427, it is necessary to provide a heat insulator around the tank so as to heat-insulate the constant temperature liquid the temperature of which is adjusted and which is housed in the tank. As a result, the apparatus increases in size and weight to thereby increase a cost of manufacturing.

The present invention has been accomplished to solve the above problems and it is an object of the invention to provide a constant temperature liquid circulating apparatus for achieving heat insulation and regulation of a liquid level of a constant temperature liquid a temperature of which is adjusted and which is housed in the tank by utilizing the same gap formed around the tank to thereby eliminate a heat insulator from the tank, the whole apparatus being able to be reduced in size and weight to thereby suppress a cost of manufacturing.

METHOD TO SOLVE THE PROBLEM

To achieve the above object, according to the invention, there is provided a constant temperature liquid circulating apparatus comprising: a main tank for housing a constant temperature liquid a temperature of which is adjusted, the main tank having a bottom and closed with a lid; a sub tank in which the whole main tank is disposed, the sub tank having a bottom and closed with a lid; a feed pipe and a return pipe for connecting the main tank and a load to which the constant temperature liquid is to be supplied; and a circulating pump for supplying the constant temperature liquid to the load through these feed pipe and return pipe in a circulating manner, wherein the main tank is supported in the sub tank with a gap as a heat insulating layer around the main tank and a liquid level regulating mechanism for regulating a liquid level in the main tank by supplying and discharging the constant temperature liquid between inside of the main tank and the gap in the sub tank is provided.

Thus, heat insulation and regulation of the liquid level of the constant temperature liquid housed in the main tank can be achieved by utilizing the same gap formed between the main tank and the sub tank.

Here, the sub tank is preferably provided with a liquid discharge mechanism for discharging the constant temperature liquid housed in the gap in the sub tank outside. Thus, it is possible to discharge the constant temperature liquid remaining in the gap in the sub tank outside during steady operation of the circulating apparatus to thereby prevent reduction of a heat insulating effect of the gap.

To put is concretely, the liquid discharge mechanism has a discharge hole formed in a bottom portion of the sub tank and opened and closed by a first valve. By opening the valve to open the discharge hole, the constant temperature liquid can be discharged outside the sub tank.

The main tank is preferably provided with first liquid level sensing means for sensing the liquid level of the constant temperature liquid housed in the main tank, the sub tank is preferably provided with second liquid level sensing means for sensing a liquid level of the constant temperature liquid housed in the gap in the sub tank, and the liquid discharge mechanism preferably discharges the constant temperature liquid housed in the gap in the sub tank outside when the first liquid level sensing means senses that the liquid level in the main tank is equal to or higher than a predetermined lowest liquid level and the second liquid level sensing means senses that the liquid level in the sub tank is equal to or higher than a predetermined liquid level.

According to one aspect of the constant temperature liquid circulating apparatus of the invention, the liquid level regulating mechanism has a discharge hole provided to an upper portion of the main tank to allow the constant temperature liquid housed in the main tank to overflow into the gap in the sub tank and a regulating pump for supplying the constant temperature liquid housed in the gap in the sub tank into the main tank.

At this time, it is preferable that the discharge hole is formed in a side wall of the main tank and has a second valve for opening and closing the discharge hole.

According to another aspect, the liquid level regulating mechanism has a regulating pump for supplying and discharging the constant temperature liquid between inside of the main tank and the gap in the sub tank.

According to yet another aspect, the liquid level regulating mechanism has a gas supply source for supplying compressed gas to the gap in the sub tank and a supply/discharge hole formed in a bottom portion of the main tank and opened and closed by a third valve, the mechanism regulating the liquid level in the main tank by regulating pressure in the gap in the sub tank to supply and discharge the constant temperature liquid between the inside of the main tank and the gap in the sub tank through the supply/discharge hole.

With the constant temperature liquid circulating apparatus according to the invention, the whole main tank for housing the constant temperature liquid the temperature of which is adjusted is supported in the sub tank with the gap as the heat insulating layer around the main tank and the liquid level regulating mechanism can supply and discharge the constant temperature liquid between inside of the main tank and the gap formed in the sub tank. Therefore, it is possible to achieve heat insulation and regulation of the liquid level of the constant temperature liquid housed in the main tank by utilizing the same gap in the sub tank. As a result, the heat insulator can be eliminated from the main tank and the whole apparatus can be reduced in size and weight to thereby suppress the cost of manufacturing.

DESCRIPTION OF THE PREFERRED EMBODIMENT

Figure 1:
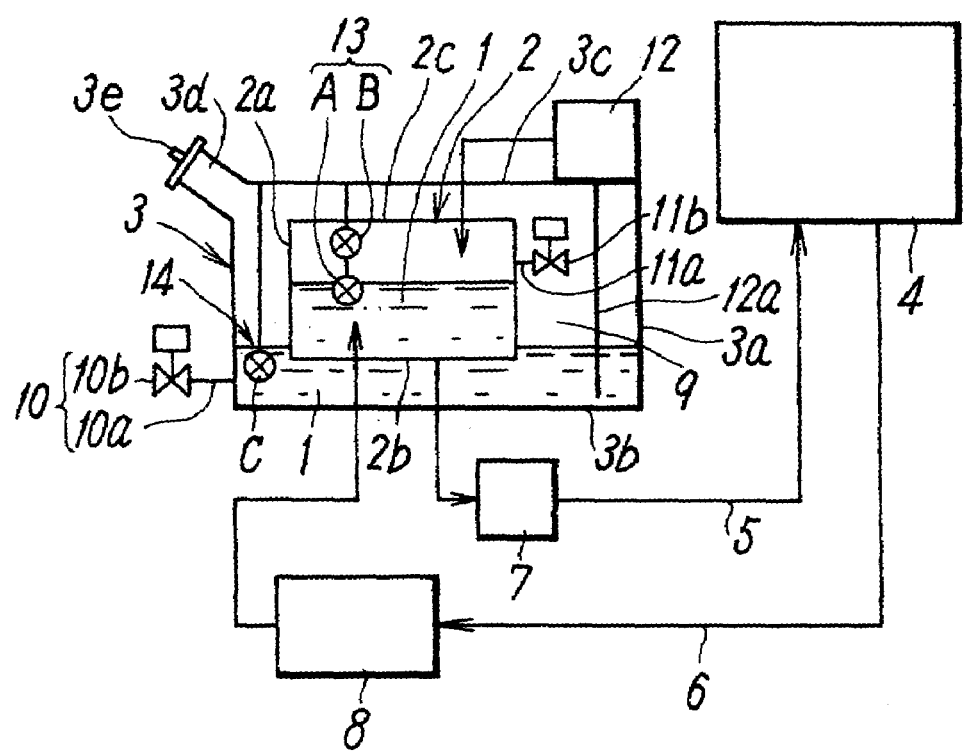
FIG. 1 is a schematic diagram of a first embodiment of a constant temperature liquid circulating apparatus according to the present invention.

FIG. 1 shows a first embodiment of a constant temperature liquid circulating apparatus according to the present invention. The circulating apparatus includes a main tank 2 for housing a constant temperature liquid 1 a temperature of which is adjusted, a sub tank 3 in which the whole main tank 2 is disposed and the constant temperature liquid 1 is similarly housed, a feed pipe 5 and a return pipe 6 connecting the main tank 2 and a load 4 to which the constant temperature liquid 1 is to be supplied, a circulating pump 7 for supplying the constant temperature liquid 1 to the load 4 through these feed pipe 5 and return pipe 6 in a circulating manner, and a temperature adjusting means 8 for adjusting the temperature of the constant temperature liquid 1 which has returned from the load 4.

The main tank 2 is formed of a cylindrical side wall 2a, a bottom plate 2b for closing a lower end of the side wall 2a to form a bottom of the main tank 2, and a lid plate 2c for closing an upper end of the side wall 2a and has a structure having the bottom and closed with the lid. To the main tank 2, the feed pipe 5 for feeding the constant temperature liquid 1 to the load 4 and the return pipe 6 for allowing temperature liquid 1 to flow back to the main tank 2 from the load 4 are connected. On the feed pipe 5, the circulating pump 7 is provided. Provided on the return pipe 6 is the temperature adjusting means 8 formed of a heat exchanger, a heater, and the like, for example, for adjusting the temperature of the constant temperature liquid 1 which has given and received heat to and from the load 4 to a proper set temperature. The circulating pump 7 may be a submerged pump and the temperature adjusting means 8 may be provided in the main tank 2.

On the other hand, the sub tank 3 is formed of a cylindrical side wall 3a, a bottom plate 3b for closing a lower end of the side wall 3a to form a bottom of the sub tank 3, and a lid plate 3c for closing an upper end of the side wall 3a and has a structure having the bottom and closed with the lid, similar to the main tank 2. A height of the side wall 3a of the sub tank 3 and sizes of the bottom plate 3b and the lid plate 3c are greater than those of the main tank 2 so that the whole main tank 2 can be housed in the sub tank 3. Moreover, at an upper portion of the sub tank 3, an injection hole 3d for injecting the constant temperature liquid 1 into the sub tank 3 is provided and can be opened and closed by a cap 3e.

In the sub tank 3, the main tank 2 is supported by proper means with a gap 9 functioning as a heat insulating layer existing between an outer face of the main tank 2 and an inner face of the sub tank 3. With this gap 9 formed throughout a periphery of the main tank 2 and between the sub tank 3 and the main tank 2, it is possible to heat-insulate the constant temperature liquid 1 the temperature of which is adjusted by the temperature adjusting means 8 and which is housed in the main tank 2.

At the same time, in the circulating apparatus of the present embodiment, by a liquid level regulating mechanism which will be described later, the constant temperature liquid 1 is supplied and discharged and moved between an inside of the main tank 2 and the gap 9 in the sub tank 3. In this way, in recovering the constant temperature liquid 1 filling the flow path in the load 4, the feed pipe 5, and the return pipe 6, for example, the constant temperature liquid 1 which is too much to be housed in the main tank 2 can be housed in the gap 9 in the sub tanks 3 or the constant temperature liquid 1 housed in the gap 9 in the sub tank 3 can be supplied into the main tank 2 so as to prevent hindrance of the operation of the circulating apparatus by the reduction in the liquid level in the main tank 2 when the operation of the circulating apparatus starts to thereby regulate the liquid level in the main tank 2.

In this manner, because the whole main tank 2 for housing the constant temperature liquid 1 the temperature of which is adjusted is supported in the sub tank 3 with the gap 9 as the heat insulating layer existing around the main tank 2 and because the constant temperature liquid 1 can be supplied and discharged between the inside of the main tank 2 and the gap 9 formed in the sub tank 3 by the liquid level regulating mechanism, heat insulation and regulation of the liquid level of the constant temperature liquid 1 housed in the main tank 2 can be achieved by utilizing the same gap 9 in the sub tank 3. As a result, it is possible to eliminate the heat insulator which has conventionally been used from the main tank 2 to thereby reduce the whole circulating apparatus in size and weight to suppress the cost of manufacturing. Moreover, because an operation for separating the heat insulator is unnecessary at the time of disposal of the apparatus, a cost of disposal can be suppressed.

Furthermore, the sub tank 3 is provided with a liquid discharge mechanism 10 for discharging the constant temperature liquid 1 housed in the gap 9 in the sub tank 3 outside. To put it concretely, the liquid discharge mechanism 10 is formed of a discharge hole 10a formed in a position of the side wall 3a of a bottom portion of the sub tank 3 and lower than a bottom face of the main tank 2 and a first valve 10b for opening and closing the discharge hole 10a. The discharge hole 10a may be formed in the bottom plate 3b of the sub tank 3. The constant temperature liquid 1 housed in the gap 9 in the sub tank 3 reduces the heat insulating effect of the gap 9. However, after the operation of the circulating apparatus starts, when the constant temperature liquid 1 is distributed throughout the flow path in the load 4, the feed pipe 5, and the return pipe 6 and the constant temperature liquid 1 of the proper liquid level is kept in the main tank 2 (see FIG. 3(d)), i.e., during the steady operation, by opening the first valve 10b to open the discharge hole 10a and discharging the constant temperature liquid 1 remaining in the gap 9 in the sub tank 3 outside, it is possible to prevent reduction in the heat insulating effect of the gap 9.

The load 4 is a heat load, for example. In this case, the constant temperature liquid 1 is a coolant. As the coolant as the constant temperature liquid 1, completely fluorinated liquid, pure water, ethylene glycol, or the like is used, for example.

The liquid level regulating mechanism specifically includes a discharge hole 11a opened and closed by a second valve 11b formed at the side wall 2a of an upper portion of the main tank 2 and a regulating pump 12 provided on a supply pipe 12a connecting the inside of the main tank and the gap in the sub tank. By opening the second valve 11b to open the discharge hole 11a, the constant temperature liquid 1 housed in the main tank 2 can overflow into the gap 9 in the sub tank 3. Furthermore, by driving the regulating pump 12, the constant temperature liquid 1 housed in the gap 9 in the sub tank 3 is drawn up from the bottom portion of the sub tank 3 through the supply pipe 12a and supplied to the upper portion of the main tank 2. Here, the regulating pump 12 may be a submerged pump.

The main tank 2 is provided with a first liquid level sensing means 13 for sensing the liquid level of the constant temperature liquid 1 housed in the main tank 2 and the sub tank 3 is provided with a second liquid level sensing means 14 for sensing the liquid level of the constant temperature liquid 1 housed in the gap 9 in the sub tank 3. To put it concretely, the first liquid level sensing means 13 is formed of a level sensor A disposed in a position in the main tank 2 and lower than the discharge hole 11a and at a height corresponding to the lowest liquid level of the main tank 2 and a level sensor B disposed in a position in the main tank 2 and higher than the discharge hole 11a and at a height corresponding to the highest liquid level of the main tank 2. On the other hand, the second liquid level sensing means 14 is formed of a level sensor C disposed in a position in the bottom portion of the sub tank 3 and higher than the discharge hole 10a and in a position lower than the bottom face of the main tank 2. The respective liquid level sensing means 13 and 14 are not limited to the above-described level sensors but may be level switches or anything that can sense the liquid level.

If the first liquid level sensing means 13 senses that the liquid level in the main tank 2 is lower than the predetermined lowest liquid level and the second liquid level sensing means 14 senses that the liquid level in the sub tank 3 is equal to or higher than the predetermined liquid level, i.e., if the constant temperature liquid 1 is not sensed by the level sensor A and the constant temperature liquid 1 is sensed by the level sensor C, the regulating pump 12 is driven to supply the constant temperature liquid 1 from the gap 9 in the sub tank 3 into the main tank 2.

If the first liquid level sensing means 13 senses that the liquid level in the main tank 2 is equal to or higher than the predetermined highest liquid level, i.e., if the constant temperature liquid 1 is sensed by the level sensor B, the second valve 11b is opened to discharge the constant temperature liquid 1 overflowing the main tank 2 into the gap 9 in the sub tank 3 through the discharge hole 11a. It is also possible that the second valve 11b is opened and closed manually and an alarm is given to urge the opening operation.

During the above-described steady operation of the circulating apparatus, if the first liquid level sensing means 13 senses that the liquid level in the main tank 2 is equal to or higher than the predetermined lowest liquid level and the second liquid level sensing means 14 senses that the liquid level in the sub tank 3 is equal to or higher than the predetermined liquid level, i.e., if the constant temperature liquid 1 is sensed simultaneously by the level sensor A and the level sensor C, the discharge hole 10a is opened by the first valve 10b to discharge the constant temperature liquid 1 housed in the gap 9 in the sub tank 3 outside.

Moreover, if the first liquid level sensing means 13 senses that the liquid level in the main tank 2 is lower than the predetermined lowest liquid level and the second liquid level sensing means 14 senses that the liquid level in the sub tank 3 is lower than the predetermined liquid level, i.e., if neither of the level sensors A and C senses the constant temperature liquid 1, an alarm is given to urge replenishing of the gap 9 with the constant temperature liquid 1 through the injection hole 3d of the sub tank 3.

Figure 4:
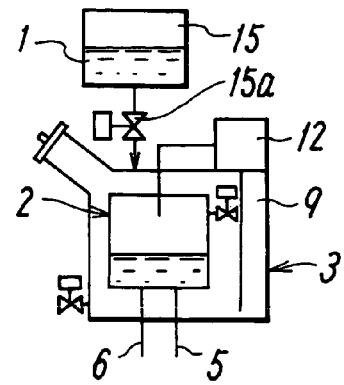
FIG. 4 is a schematic diagram showing another form of the constant temperature liquid circulating apparatus.

Here, as shown in FIG. 4, it is also possible that an auxiliary tank 15 in which the constant temperature liquid 1 is housed is connected from outside to the sub tank 3 through a third valve 15a and that the third valve 15a is opened to replenish the gap 9 in the sub tank 3 with the constant temperature liquid 1 from the auxiliary tank 15 when neither of the level sensors A and C senses the constant temperature liquid 1. It is also possible that the third valve 15a is opened and closed manually and that an alarm is given to urge the opening operation of the third valve 15a.

Next, operation of the constant temperature liquid circulating apparatus according to the first embodiment will be described in detail based on FIGS. 2 and 3.

Figure 2:
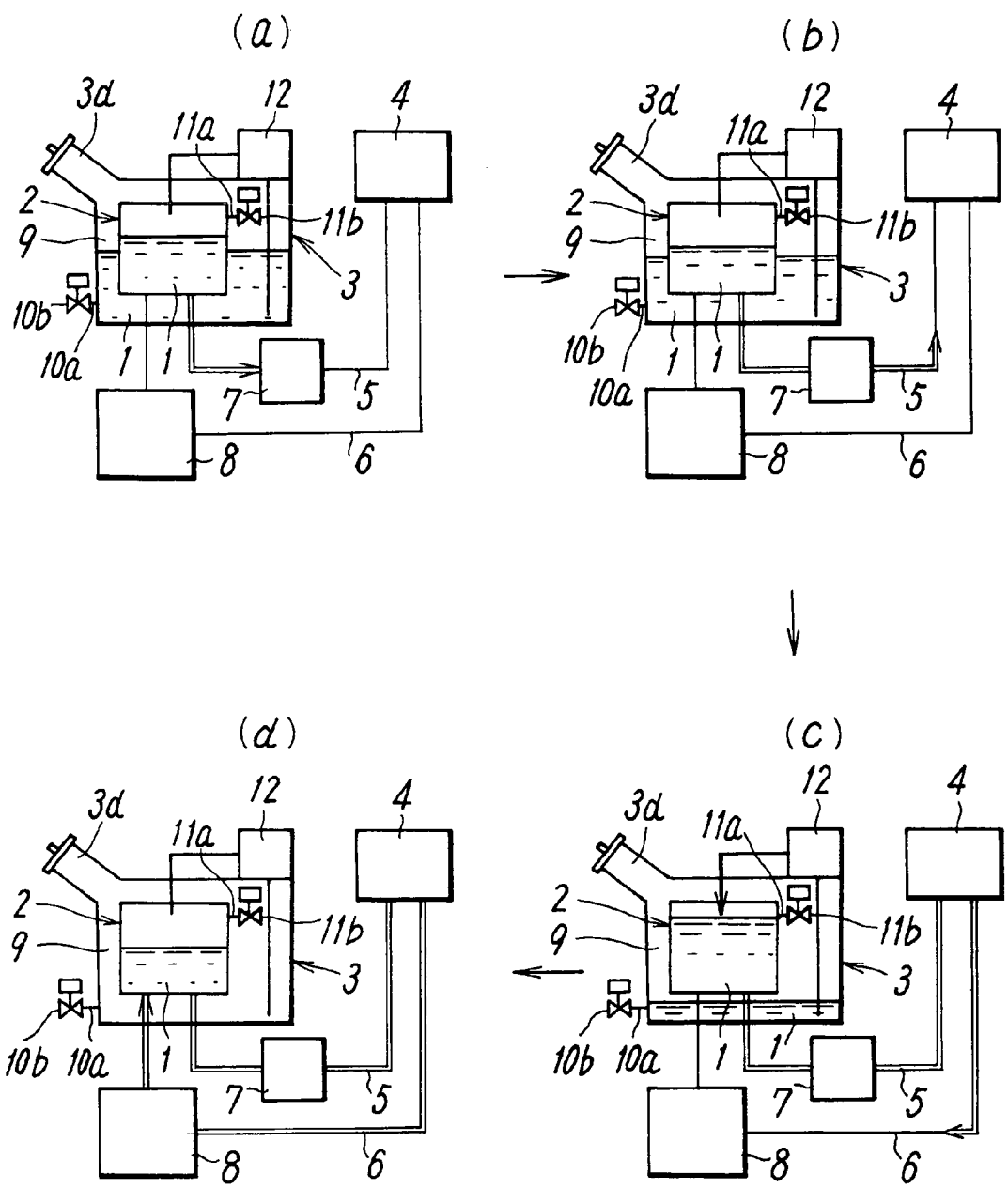
FIGS. 2(a) to 2(d) are schematic diagrams showing the operation when the operation of the constant temperature liquid circulating apparatus starts.
Figure 3:
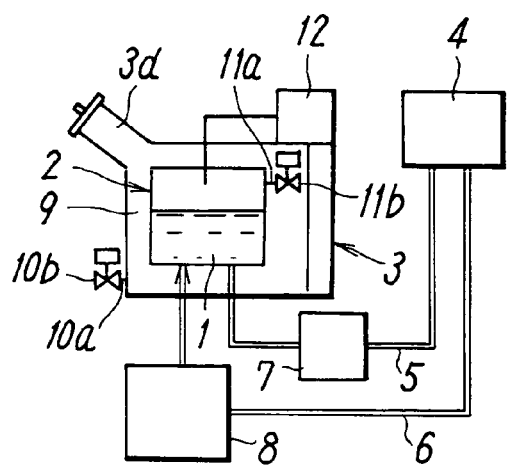
FIGS. 3(a) to 3(d) are schematic diagrams showing the operation when the operation of the constant temperature liquid circulating apparatus is completed.
Figure 3:
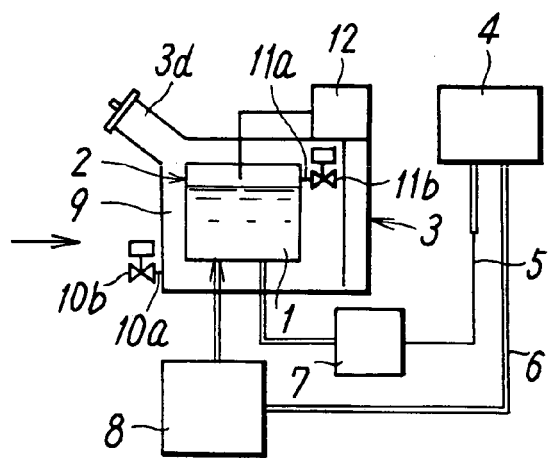
Figure 3:
Figure 3:
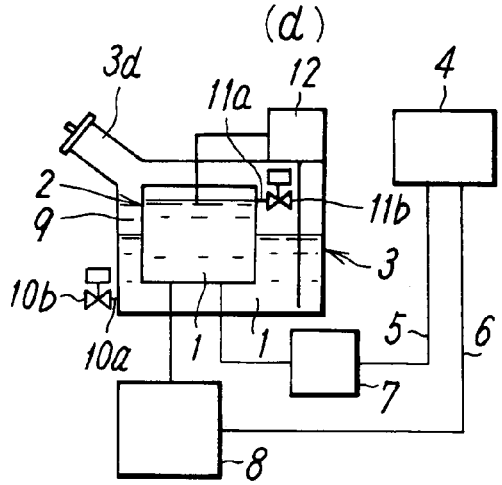
Figure 3:
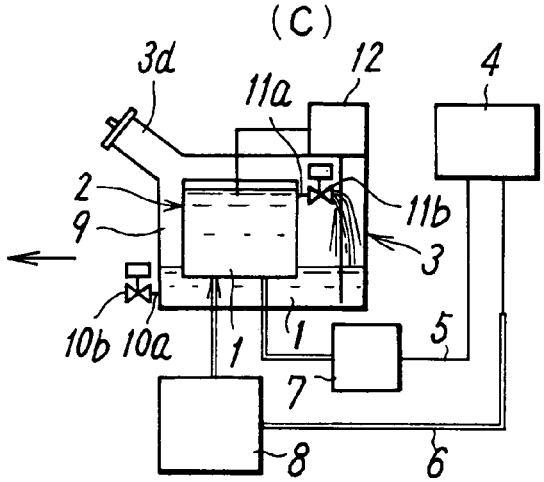

First, when the operation starts, as shown in FIG. 2, the constant temperature liquid 1 is injected into the gap 9 in the sub tank 3 from the injection hole 3d. In a state in which the constant temperature liquid 1 is sensed by the level sensor C and not sensed by the level sensor A, the regulating pump 12 is driven to draw up the constant temperature liquid 1 from the gap 9 in the sub tank 3 into the main tank 2 until the sensor A senses the constant temperature liquid 1. At this time, an extra amount of constant temperature liquid 1 to be, sent into the flow path in the load 4, the feed pipe 5, and the return pipe 6 is injected into the sub tank 3 (FIG. 2(a)).

Then, if the circulating pump 7 is driven, the constant temperature liquid 1 in the main tank 2 is sent from the feed pipe 5 into the flow path in the load 4 and the return pipe 6 in order and, as a result, the liquid level in the main tank 2 reduces and the level sensor A does not sense the constant temperature liquid 1. Then, the regulating pump 12 is driven to draw up the constant temperature liquid 1 in the sub tank 3 into the main tank 2 (FIGS. 2(b) to 2(d)). At this time, the constant temperature liquid 1 which is finally left in the sub tank 3 is discharged outside the sub tank 3 from the discharge hole 10a by opening the first valve 10b.

Next, during the steady operation, the constant temperature liquid 1 the temperature of which is adjusted by the temperature adjusting means 8 is supplied by the circulating pump 7 from the main tank 2 to the load 4 through the feed pipe 5 and the return pipe 6 in the circulating manner and, at the same time, the constant temperature liquid 1 the temperature of which is adjusted and which is housed in the main tank 2 is heat-insulated by the heat insulating effect of the gap 9 in the sub tank 3.

When the completely fluorinated liquid a volume of which changes by a large amount depending on the temperature is used as the constant temperature liquid 1, if a set temperature of the constant temperature liquid 1 is changed to a higher temperature by the temperature adjusting means 8 and the temperature of the constant temperature liquid 1 increases to a higher temperature, the volume of the constant temperature liquid 1 increases. Therefore, if the constant temperature liquid 1 in the main tank 2 is sensed by the level sensor B during the steady operation, the second valve 11b is opened to allow the constant temperature liquid 1 to overflow through the discharge hole 11a into the gap 9 in the sub tank 3. Then, when the constant temperature liquid 1 in the sub tank 3 is sensed by the level sensor C, the first valve 10b is opened to discharge the constant temperature liquid 1 outside the sub tank 3 through the discharge hole 10a. When the constant temperature liquid 1 is not sensed by the level sensor B, the second valve 11b is closed.

On the other hand, when the set temperature of the constant temperature liquid 1 is changed to a lower temperature by the temperature adjusting means 8 and the temperature of the constant temperature liquid 1 reduces to a lower temperature, the volume of the constant temperature liquid 1 reduces. Therefore, when the constant temperature liquid 1 in the main tank 2 is not sensed by the level sensor A during the steady operation, an instruction to replenish the sub tank 3 by adding a necessary amount of constant temperature liquid 1 is provided. Then, if the replenished constant temperature liquid 1 is sensed by the level sensor C, the liquid 1 is drawn up by the regulating pump 12 and supplied to the main tank 2 until the liquid 1 is sensed by the level sensor A. At this time, the constant temperature liquid 1 which is finally left in the sub tank 3 is discharged outside the sub tank 3 through the discharge hole 10a by opening the first valve 10b.

In recovering the constant temperature liquid 1 into the tanks 2, 3 when the operation is completed, the temperature of the constant temperature liquid 1 is first adjusted by the temperature adjusting means 8 to a higher temperature than a dew-point temperature in the room so as to prevent occurrence of condensation. Then, as shown in FIG. 3, the constant temperature liquid 1 filling the flow path in the load 4, the feed pipe 5, and the return pipe 6 is recovered into the main tank 2 by air purge or the like. When the liquid level in the main tank 2 increases (FIG. 3(b)) and the constant temperature liquid 1 is sensed by the level sensor B, the second valve 11b is opened to cause the constant temperature liquid 1 to overflow through the discharge hole 11a into the gap 9 in the sub tank 3 (FIG. 3(c)). When the recovery of the constant temperature liquid 1 is completed and it is recognized that the constant temperature liquid 1 is not sensed by the level sensor B, the second valve 11b is closed (FIG. 3(d)). If the liquid level of the sub tank 3 reaches the height of the second valve 11b before the recovery is completed, it is preferable that the level sensor B senses an abnormal condition of the liquid level and gives an alarm.

Figure 5:
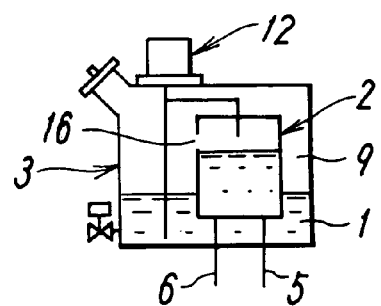
FIG. 5 is a schematic diagram showing a second embodiment of the constant temperature liquid circulating apparatus according to the invention.
Figure 6:
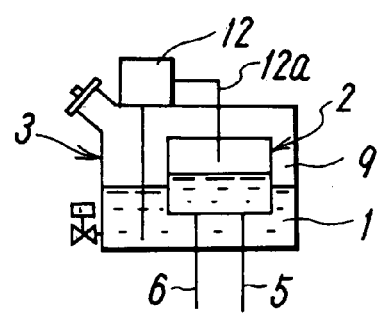
FIG. 6 is a schematic diagram showing a third embodiment of the constant temperature liquid circulating apparatus according to the invention.
Figure 7:
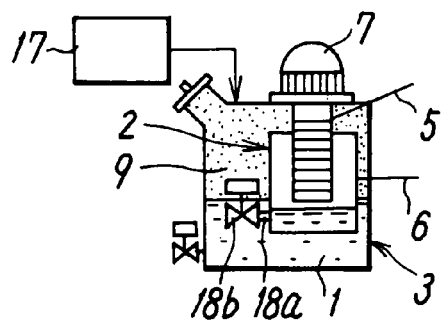
FIG. 7 is a schematic diagram showing a fourth embodiment of the constant temperature liquid circulating apparatus according to the invention.

FIGS. 5 to 7 show second to fourth embodiments of the constant temperature liquid circulating apparatus according to the invention. Here, in order to avoid overlaps, detailed descriptions of the component parts similar to those of the first embodiment will be omitted.

First, in the second embodiment shown in FIG. 5, the liquid level regulating mechanism includes a discharge hole 16 formed in a position of the side wall 2a of the upper portion of the main tank 2 and at a height corresponding to the highest liquid level of the constant temperature liquid 1 and the submerged pump as the regulating pump 12. Through the discharge hole 16, inside of the main tank 2 and the gap 9 in the sub tank 3 always communicate with each other. Therefore, in the present embodiment, the second valve 11b in the first embodiment is omitted.

Next, in the third embodiment shown in FIG. 6, the liquid level regulating mechanism includes the regulating pump 12 for supplying and discharging the constant temperature liquid 1 between inside of the main tank 2 and the gap 9 in the sub tank 3 and an end portion on the main tank 2 side of a supply pipe 12a connected to the regulating pump 12 is open in a position at a height corresponding to the highest liquid level of the main tank 2. Therefore, in the present embodiment, the discharge hole 11a and the second valve 11b in the first embodiment are omitted.

Furthermore, in the fourth embodiment shown in FIG. 7, the liquid level regulating mechanism includes a gas supply source 17 for supplying compressed gas to the gap 9 in the sub tank 3 and a supply/discharge hole 18a formed in the side wall 2a of the bottom portion of the main tank 2 to be opened and closed by a third valve 18b. By regulating pressure of the gap 9 in the sub tank 3 to supply and discharge the constant temperature liquid 1 between the inside of the main tank 2 and the gap 9 in the sub tank 3 through the supply/discharge hole 18a, the liquid level in the main tank 2 can be regulated. As the circulating pump 7, a submerged pump is employed. Therefore, in the present embodiment, the regulating pump 12, the discharge hole 11a, and the second valve 11b in the first embodiment are omitted. The supply/discharge hole 18a may be provided in the bottom plate 2b of the main tank 2.

The invention claimed is:

1. A constant temperature liquid circulating apparatus comprising: a main tank for housing a constant temperature liquid a temperature of which is adjusted, the main tank having a bottom and closed with a lid; a sub tank in which the whole main tank is disposed, the sub tank having a bottom and closed with a lid; a feed pipe and a return pipe for connecting the main tank and a load to which the constant temperature liquid is to be supplied; and a circulating pump for supplying the constant temperature liquid to the load through these feed pipe and return pipe in a circulating manner, wherein the main tank is supported in the sub tank with a gap as a heat insulating layer around the main tank and a liquid level regulating mechanism for regulating a liquid level in the main tank by supplying and discharging the constant temperature liquid between inside of the main tank and the gap in the sub tank is provided.

2. A constant temperature liquid circulating apparatus according to claim 1, wherein the sub tank is provided with a liquid discharge mechanism for discharging the constant temperature liquid housed in the gap in the sub tank outside.

3. A constant temperature liquid circulating apparatus according to claim 2, wherein the liquid discharge mechanism has a discharge hole formed in a bottom portion of the sub tank and opened and closed by a first valve.

4. A constant temperature liquid circulating apparatus according to claim 2 or 3,
wherein the main tank is provided with first liquid level sensing means for sensing the liquid level of the constant temperature liquid housed in the main tank,
the sub tank is provided with second liquid level sensing means for sensing a liquid level of the constant temperature liquid housed in the gap in the sub tank, and
the liquid discharge mechanism discharges the constant temperature liquid housed in the gap in the sub tank outside when the first liquid level sensing means senses that the liquid level in the main tank is equal to or higher than a predetermined lowest liquid level and the second liquid level sensing means senses that the liquid level in the sub tank is equal to or higher than a predetermined liquid level.

5. A constant temperature liquid circulating apparatus according to any one of claims 1 to 3, wherein the liquid level regulating mechanism has a discharge hole provided to an upper portion of the main tank to allow the constant temperature liquid housed in the main tank to overflow into the gap in the sub tank and a regulating pump for supplying the constant temperature liquid housed in the gap in the sub tank into the main tank.

6. A constant temperature liquid circulating apparatus according to claim 5, wherein the discharge hole is formed in a side wall of the main tank and has a second valve for opening and closing the discharge hole.

7. A constant temperature liquid circulating apparatus according to any one of claims 1 to 3, wherein the liquid levels regulating mechanism has a regulating pump for supplying and discharging the constant temperature liquid between inside of the main tank and the gap in the sub tank.

8. A constant temperature liquid circulating apparatus according to any one of claims 1 to 3, wherein the liquid level regulating mechanism has a gas supply source for supplying compressed gas to the gap in the sub tank and a supply/discharge hole formed in a bottom portion of the main tank and opened and closed by a third valve, the mechanism regulating the liquid level in the main tank by regulating pressure in the gap in the sub tank to supply and discharge the constant temperature liquid between inside of the main tank and the gap in the sub tank through the supply/discharge hole.

* * * * *